US006753354B2

(12) United States Patent
Koveal et al.

(10) Patent No.: US 6,753,354 B2
(45) Date of Patent: *Jun. 22, 2004

(54) FISCHER-TROPSCH CATALYST ENHANCEMENT

(75) Inventors: Russell John Koveal, Baton Rouge, LA (US); Michel Daage, Baton Rouge, LA (US); Eric Baochun Shen, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/059,916

(22) Filed: Jan. 29, 2002

(65) Prior Publication Data

US 2003/0166451 A1 Sep. 4, 2003

(51) Int. Cl.[7] .................. C07C 27/00; B01J 20/34; B01J 23/40; B01J 23/72
(52) U.S. Cl. ............... 518/715; 518/700; 518/709; 518/710; 518/713; 502/38; 502/53; 502/54; 502/326; 502/331
(58) Field of Search ................ 518/700, 709, 518/710, 713, 715; 502/38, 53, 54, 326, 331

(56) References Cited

U.S. PATENT DOCUMENTS

| | | | |
|---|---|---|---|
| 2,369,956 A | 2/1945 | Feisst et al. ............. 260/449.6 |
| 2,542,558 A | 2/1951 | Naragon et al. ............. 252/416 |
| 3,256,205 A | 6/1966 | Constabaris et al. ........ 252/413 |
| 3,661,798 A | 5/1972 | Cosyns et al. .............. 252/416 |
| 3,839,191 A | 10/1974 | Johnson ...................... 208/108 |
| 4,172,053 A | 10/1979 | Vogt et al. .................. 252/447 |
| 4,191,664 A | 3/1980 | McArthur .................... 252/466 |
| 4,399,234 A | 8/1983 | Beuther et al. ............. 518/715 |
| 4,795,726 A | 1/1989 | Schaper et al. ............... 502/26 |
| 4,814,066 A | 3/1989 | Fu .............................. 208/120 |
| 4,888,131 A | 12/1989 | Goetsch et al. ............. 252/373 |
| 4,929,336 A | 5/1990 | Lowery et al. .............. 208/120 |
| 4,954,244 A | 9/1990 | Fu et al. ..................... 208/120 |
| 4,978,689 A | 12/1990 | Bell et al. .................... 518/709 |
| 5,070,058 A | 12/1991 | Sawicki et al. ............. 502/206 |
| 5,160,456 A | 11/1992 | Lahn et al. .................. 252/373 |
| 5,283,216 A | 2/1994 | Mitchell ....................... 502/30 |
| 5,292,705 A | 3/1994 | Mitchell ...................... 502/325 |
| 5,389,592 A | 2/1995 | Weissman et al. ............ 502/25 |
| 5,438,028 A | 8/1995 | Weissman et al. .......... 502/202 |
| 5,495,055 A | 2/1996 | Rueter ......................... 568/881 |
| 5,728,918 A | 3/1998 | Nay et al. .................... 585/733 |
| 5,863,856 A | 1/1999 | Mauldin ..................... 502/325 |
| 6,130,184 A * | 10/2000 | Geerlings et al. ........... 502/350 |
| 6,201,030 B1 | 3/2001 | Beer ........................... 518/709 |
| 6,331,574 B1 * | 12/2001 | Lapidus et al. ............. 518/709 |
| 6,355,593 B1 | 3/2002 | Daage et al. ................ 502/111 |

FOREIGN PATENT DOCUMENTS

| | | | |
|---|---|---|---|
| DE | 4302992 A1 | 8/1994 | ........... B01J/23/94 |
| EP | 0244014 A2 | 11/1987 | ........... B01J/38/64 |
| EP | 0244014 B1 | 11/1987 | ........... B01J/38/64 |
| EP | 0583837 A1 | 2/1994 | ........... B01J/37/00 |
| EP | 0583837 B1 | 2/1994 | ........... B01J/37/00 |
| EP | 0979673 A1 | 2/2000 | ........... B01J/37/02 |

OTHER PUBLICATIONS

A. Khodakov et al., "Structural Modification of Cobalt Catalysts: Effect of Wetting Studied by X–Ray and Infrared Techniques", *Oil & Gas Science and Tehcnology*, Rev. IFP, vol. 54 (1999), No. 4. pp. 525–535.

* cited by examiner

Primary Examiner—J. Parsa
(74) Attorney, Agent, or Firm—Jay Simon; Mark D. Marin

(57) ABSTRACT

There is provided a process for hydrocarbon synthesis wherein a supported metal catalyst for hydrogenating carbon monoxide to form a mixture of hydrocarbons is regenerated by decreasing its hydrocarbon content, impregnating under a non-oxidative atmosphere with a solution of at least one member selected from the group consisting of ammonium salts, alkyl ammonium salts and weak organic acids, optionally including ammonia, oxidizing with a gaseous oxidant in the presence of the impregnating solution, activating the catalyst by reduction with hydrogen at elevated temperatures and reusing the catalyst. The treatment may be carried out in a single reactor, or by carrying out up to all steps after catalyst has been withdrawn therefrom and returned to at least one reactor. Up to all steps subsequent to decreasing the hydrocarbon content may be effected in a subsequent reactor, or in specialized apparatus.

55 Claims, No Drawings

FISCHER-TROPSCH CATALYST ENHANCEMENT

This invention relates to the production of higher hydrocarbons from synthesis gas utilizing a supported metal catalyst, particularly a cobalt catalyst.

RELATED APPLICATIONS

The assignee of this application is filing herewith the following applications: Docket No. 37228, entitled "Supported Catalyst Regeneration"; Docket No. 37229, entitled "Supported Catalyst Activation"; Docket No. 39158, entitled "Supported Catalyst Treatment"; Docket No. 39773, entitled "Catalyst Enhancement"; and Docket No. 39774, entitled "Catalyst Regeneration". Also related in pending application Ser. No. 09/628,047, filed Aug. 1, 2000, entitled "process for Increasing Cobalt Catalyst Hydrogenation Activity Via Aqueous Low Temperature Oxidation".

BACKGROUND OF THE INVENTION

The conversion of synthesis gas, i.e. carbon monoxide and hydrogen, to higher value products is well known and has been in commercial use for many years. Typical processes include, for example, methanol syntheses, higher alcohol synthesis, hydroformylation and Fischer-Tropsch synthesis. The synthesis gas mixture is contacted with a suitable catalyst typically comprising at least one Group VIII metals. Suitable Fischer-Tropsch catalysts comprise one or more catalytic Group VIII metals, such as iron, cobalt and nickel. For oxygenate synthesis, copper may be included as well.

There exist many variations of the formulation and preparation of catalysts useful for the conversion of synthesis gas. In general, the catalysts are classified into two broad types, unsupported metals, known as Dispersed Active Metals and a larger groups of catalysts metals supported on refractory oxides, such as silica, alumina, titania or mixtures thereof. Such catalysts, whether supported or unsupported may be enhanced by the addition of other metals or metal oxides, known as promoter metals.

Supports for catalyst metals are generally pilled, pelleted, beaded, extruded, spray-dried or sieved materials. There are many methodologies reported in the literature for the preparation of supported catalyst metals. Examples of such techniques include incipient wetness impregnation, slurry impregnation, coprecipitation, and the like. It will be appreciated that high metal loadings are generally obtained by coprecipitation or multiple, i.e. two or three, impregnations, whereas low metal loading catalysts may be prepared utilizing a single impregnation. The catalyst metal content of such catalysts may vary from one to fifty weight percent. Promoter metals or metal oxides may be added during the impregnation steps using soluble salts of the respective metals such as Pt, Pd, Rh, Ru, Os, Ir, Mo, W, Cu, Si, Cr, Ti, Mg, Mn, Zr, Hf, Al, Th and the like. It will further be appreciated that the choice of a particular metal combination and the amount thereof to be utilized will depend upon the specific application used in the conversion of synthesis gas. When a suitable support has been impregnated with one or more metals as by impregnation to form a catalyst precursor, it may be dried and then calcined in an oxygen-containing environment. The precursor is thereafter activated by reduction at elevated temperature in the presence of a reducing gas, typically containing hydrogen. Optionally, the catalyst is activated by contacting with hydrogen gas in presence of liquid hydrocarbons as disclosed in U.S. Pat. No. 5,292,705.

Regardless of the particular formulation and method of preparation, all catalysts lose productivity and/or selectivity in use. Selectivity may vary with the particular synthesis, but is generally expressed in terms of the percent of an undesirable substance in the product mix. For example, methane selectivity in a Fischer-Tropsch reaction is the percent of methane formed with the desired higher hydrocarbons. Degradation of the catalyst productivity may be due to a number of phenomena including, without limitation, contamination by catalytic poisons, deposition of carbonaceous residues, sintering, phase transformation of the metal or metals and the like. U.S. Pat. No. 5,283,216 discloses a method for rejuvenating an hydrocarbon synthesis catalyst, which has been subjected to reversible, partial deactivation in a slurry synthesis process by contacting the catalyst with hydrogen at elevated temperatures in presence of liquid hydrocarbons. However, not all deactivated catalysts are rejuvenable. It is commercially significant to extend the useful life of a used catalyst by various treatment procedures, for example, by means of regeneration.

There are catalyst regeneration methods described in the literature. Typically, these techniques rely on contacting the used catalyst at elevated temperature with an oxygen-containing gas and/or steam. Such treatment may be used to remove carbonaceous deposits and poisons additionally converting the metal to its corresponding oxide or oxides. The regenerated catalyst is thereafter reactivated by means of a reduction with a hydrogen-containing gas at elevated temperatures. Such a treatment is described, for example, in U.S. Pat. No. 4,399,234.

U.S. Pat. No. 2,369,956 discloses a method for regeneration of a Fischer-Tropsch catalyst wherein the catalyst is dissolved and subsequently restored by re-precipitation of the catalytic metals. It was noted, however, that there were deposits remaining in the contact substance that materially increased the difficulty of restoring the catalyst. An example of such substances is the high molecular weight paraffins from the used catalyst that make it difficult to filter the metal salt produced by dissolution of the catalyst with acid. Since these materials make purification of the salt difficult, it is taught in the patent that hydrocarbon deposits on the catalyst must be initially removed by treatment with flowing hydrogen at elevated temperatures. The process of dissolution and reprecipitation may then be carried out. It is also taught in the patent that the pyrophoricity of the treated catalyst might be mitigated by treatment with steam prior to dissolution with strong acid. However, there is nothing in the patent regarding the efficiency of the disclosed process, or the effect of exposing a catalyst support, such as described above, with strong acid.

U.S. Pat. No. 3,256,205 discloses a method of catalyst regeneration by treatment with a strong acid to the point of incipient wetness of the catalyst prior to removal of carbonaceous deposits accumulated during the catalytic cycle. It is specifically stated that removal of the carbonaceous deposits is detrimental in that the catalyst support would be damaged by contact with the strong acid utilized. Suitable acids are stated as having a dissociation constant greater that $10^{-2}$ and are added to the catalyst in an amount varying from 0.5 stoichiometry to the stochiometry required to form the salts of the metals present in the catalyst.

Khodakov et al. In a paper in Oil & Gas Science and Technology Rev. IFP, 54, 525 (1999) teach that contacting a reduced cobalt catalyst with water, followed by drying and calcining in air results in the formation of smaller cobalt oxide crystallites relative to those that would be formed by decomposition of the initial cobalt salts. There is neither teaching nor suggestion that the disclosed methodology might have any application to catalyst regeneration.

It is clear from the foregoing discussion that there is not a clear incentive in the art to utilize any particular methodology in attempting to improve on the process of catalyst regeneration. In fact, the two patents discussed above would appear to negate each other since the first teaches that it is necessary to remove the carbonaceous deposits from the catalyst prior to treatment with acid, yet the second teaches that the carbonaceous deposits are necessary to prevent the acid from attacking the support structure. It also must be considered that it is generally not possible to use an aqueous-based solvent on a catalyst containing a waxy hydrocarbon deposit because it is hydrophobic as typically observed with Fischer-Tropsch catalysts. Hence, it would appear that the process of the second patent would not have applicability to a Fischer-Tropsch catalyst since a characteristic of the process is that the pores of the used catalyst are filled with wax that prevents good wetting by aqueous treatment solutions.

In hydroprocessing and oxidation catalysts, carbonaceous deposits are typically removed by calcination with an oxygen-containing gas at elevated temperatures. During such treatments, the metal-containing active phase of the catalyst is converted to oxides. To further improve the recovery of catalytic activity, contaminating metals are then removed by treatment with a basic solution, particularly one containing ammonium carbonate or sodium cyanide. Such treatments are illustrated, for example, in U.S. Pat. No. 4,795,726 and German Patent DE 43 02 992.

The modifying of hydroprocessing catalysts is taught, for example, in U.S. Pat. No. 5,438,028 wherein a finished catalyst is enhanced by the addition of a modifying agent in solution after which the catalyst is dried and optionally heated to a temperature of from 120° C. to about 1000° C. The process does not include a final reduction step to reactivate the catalyst. The modifiers disclosed in column three, with the exception of boron, which is not a metallic element, are all recognized poisons for Fischer-Tropsch catalysts. U.S. Pat. No. 5,389,502 discloses application of the same process for the enhancing of a hydroprocessing catalyst that has been regenerated by an oxidative treatment. The application of the modifying agent to the surface of the catalyst may be carried out to the point of incipient wetness. In both of these patents, the preferred modifying agent is boron.

U.S. Pat. No. 6,201,030 discloses a process and apparatus for regenerating a particulate catalyst during operation of a reactor. The process consists of withdrawing a partially spent catalyst as a slurry from a reactor to one of two regeneration stations, operating in parallel, treating the slurry with hydrogen and returning it to the reactor. The two regenerating stations are utilized in the alternative operating out of phase thereby facilitating continuous withdrawal and return of the slurry without substantial change in the liquid level within the reactor. The disclosed process effectively fails to provide any means of regenerating severely deactivated catalyst or of improving process reliability, such as by removing fines that may have formed in the turbulent environment of the reactor.

It is generally recognized that the economic worth of a given catalyst is a function of its original cost, its activity its regenerability and its value as a used catalyst, e.g. for metals recovery. It is apparent from the foregoing discussion that there has been considerable effort going back over many years to improve the economic worth of catalysts, since a process that will effectively increase the value of a catalyst and/or extend the useful life thereof before it must be disposed of through conventional metal recovery will significantly improve the worth of that catalyst. Effective catalyst regeneration effected while at the same time maintaining the reliability of the process requires the use of specific apparatus or combinations of specialized pieces of apparatus in combination with specific treatment techniques. Such process techniques and apparatus for carrying them out are provided in accordance with the present invention.

SUMMARY OF THE INVENTION

In accordance with the present invention, there is provided a significant improvement in the catalytic hydrogenation of carbon monoxide to form a mixture of hydrocarbons in a reactor wherein the catalyst is a supported Fischer-Tropsch metal catalyst comprising: treating said catalyst to decrease the hydrocarbon content thereof, impregnating with a solution of an ammonium or alkyl ammonium salt or a weak acid in the presence of a non-oxidative atmosphere, oxidizing in the presence of the impregnating solution at low temperatures, activating the catalyst by contacting it with an hydrogen-containing gas at elevated temperatures and reusing said catalyst for carbon monoxide hydrogenation.

The catalyst treated according to the invention may be withdrawn from a carbon monoxide hydrogenation reactor and returned to at least one reactor, preferably during operation of the reactors. One up to all of the treating steps through activation of the catalyst may be carried out prior to withdraw, subsequent to return, or between withdraw and return. The withdraw and return steps may be carried out periodically or continuously.

DETAILED DESCRIPTION OF THE INVENTION

Supported metal catalysts, which correspond essentially to reduced metals formed by one of the recognized techniques discussed above onto a suitable support structure, typically a refractory inorganic oxide, such as titania, silica, silica-alumina, aluminum and the like, are utilized in a broad range of applications such as hydrogenation of hydrocarbons and carbon monoxide. Titania is a preferred support material for the catalyst metal substrates treated in accordance with the present invention. Start-up procedures for such reactions, which may include specific activation sequences, are highly dependent upon the catalytic reaction, the process design and, in particular, the reaction vessel design and configuration. The slurry bubble column reactor, is a preferred vessel for carrying out carbon monoxide hydrogenation reactions. The use of slurry bubble column for CO hydrogenation is particularly convenient in combination with the catalyst regeneration process of the present invention. In such reactors, the solid phase catalyst is dispersed or held in suspension in a liquid hydrocarbon phase by a gas phase, which continuously bubbles through the liquid phase. Supported catalysts useful for such applications contain at least 5 wt. %, preferably from 10 to 50 wt. %, of the catalyst metal in the reduced metallic form. Preferably, the catalyst comprises one or more of Co, Ni, Cu, Ru, Rh, Pd, Os, Ir, Re and Pt.

In the carbon monoxide hydrogenation reaction, syngas comprising a mixture of hydrogen and carbon monoxide is contacted with the catalyst thereby being converted into liquid and gaseous products, preferably $C_{10+}$ liquid hydrocarbons, with shifting or non-shifting conditions, preferably the latter, wherein little or no water gas shift takes place. This hydrocarbon synthesis ("HCS") process is generally carried out at temperatures of from about 160° C. to 260° C., pressures of from about 1 atm to about 100 atm, preferably from 10 atm to 40 atm, and gas space velocities of from about 100V/Hr/V to about 40,000V/Hr/V, preferably from about 1,000 V/Hr/V to about 15,000V/Hr/V. The expression "V/Hr/V" represents the standard volumes of gaseous carbon monoxide and hydrogen mixtures at 25° C. and 1 atm per hour per volume of catalyst, respectively. The molar ratio of hydrogen to carbon monoxide in the syngas feed is about 2.1:1 for the production of higher hydrocarbons. This ratio may vary to from about 1:1 to 4:1, and preferably is from about 1.8:1 to 2.2:1. These reaction conditions are well known and a particular set of reaction conditions can readily be determined from the parameters given herein. The hydrocarbon-containing products formed in the process are essentially free of sulfur and nitrogen-containing contaminants.

The hydrocarbons produced in a process as described above are typically upgraded to more valuable products by subjecting all or a portion of the $C_{5+}$ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

The syngas utilized in carbon monoxide hydrogenation may be formed by various means known to those of ordinary skill in the art, such as a fluid bed syngas generating unit as is disclosed, for example, in U.S. Pat. Nos. 4,888,131, and 5,160,456. Regardless of the source, syngas typically may contain chemical species, such as hydrogen cyanide, which over time cause deactivation of the catalyst. Other deactivating chemical species may be formed during the carbon monoxide hydrogenation process itself. It is generally recognized that deactivation by those contaminants can be reversed by treatment with hydrogen thereby renewing the catalyst. Certain other causes of catalyst deactivation that cannot be renewed by hydrogen treatment are often addressed by steam treatment and/or calcination in air, such treatments being carried out at high temperatures.

Regardless of the particular formulation, method of preparation, morphology and size of catalysts, all catalyst will undergo a loss in productivity and/or selectivity in use. Selectivity may vary with the particular synthesis, but is generally expressed in terms of the percent of an undesirable substance in the product mixture. For example, methane is an undesired presence in the Fischer-Tropsch product mixture since the object of the process is to form higher molecular weight hydrocarbons. Hence, one method of expressing the worth of a catalyst is its methane selectivity, i.e. the amount of undesirable methane in the reactor mixture.

Degradation of catalyst productivity may be due to a number of phenomena including contamination by catalytic poisons, deposition of carbonaceous residues, sintering, phase transformation of the metal or metals in the catalyst and the like. Attrition of the catalyst particulates may also occur and may lead to operational problems in slurry reactors due to the accumulation of fines, particles typically less than 10 microns in size. It is commercially significant to improve the operational reliability of the process and extend the useful life of a given catalyst prior to its disposal, for example, by means of regeneration.

In accordance with the present invention, the HCS process is enhanced by treating a supported Fischer-Tropsch catalyst by a series of steps as described below. The process is especially useful in treating used catalyst. By used is meant a catalyst that has been exposed to process conditions for the hydrogenation of carbon monoxide. The catalyst is initially treated to decrease its hydrocarbon content. Such processing step is often referred to as "catalyst dewaxing". This may be carried out by one or more of several techniques. For example, separation may be effected by gravitational or centrifugal separation which allows the hydrocarbon to be decanted, or removed by filtration, all of which require the hydrocarbons to be in a fluid state. The catalyst may also be treated with a solvent or supercritical fluid that effectively weakens the interaction of the hydrocarbon with the catalyst surface so that the liquid and solid phases can readily be separated in the same manner. This is referred to as solvent washing. Suitable solvents include, for example, paraffin solvents or naphthas, alcohols, and aromatic solvents. Supercritical fluids include, for example, carbon dioxide, light paraffins and cyclopentane.

Another means of decreasing the hydrocarbon content of the catalyst is to contact it with a hydrogen-containing gas at elevated temperatures, i.e. from about 200° C. to 600° C., preferably from 250° C. to 400° C. Typically, the hydrogen pressure would be from atmospheric to about 100 atm, preferably from atmospheric to 30 atm and gas hourly space velocities of from about 100V/Hr/V to about 40,000V/Hr/V, preferably from about 1,000 V/Hr/V to about 20,000V/Hr/V, expressed as standard volumes of the gaseous carbon monoxide and hydrogen mixtures (25° C., 1 atm.) per hour per volume of catalyst, respectively. This treatment is advantageous since it also reduces at least a portion of the catalytic metal to its metallic state. Alternatively, the catalyst may be contacted with an oxygen-containing gas or steam at elevated temperatures to effectively decrease the hydrocarbon content. Due to the oxidation that may take place during this step, it is followed by contacting with a hydrogen-containing gas at elevated temperatures to reduce at least a portion of the catalytic metal to its metallic state. Solvent washing and hydrogen treatment may also be advantageously combined in the subject process.

Even if another technique is utilized to dewax the catalyst, it is advantageously followed by contacting with a hydrogen-containing gas as discussed above so that at least a portion of the dewaxed catalyst is in its metallic state. Because of the metallic state of at least a portion of the catalyst after decreasing the hydrocarbon content, it is necessary to recover the catalyst under a non-oxidative atmosphere since some catalysts have a tendency to be pyrophoric. By non-oxidative is meant that the atmosphere need not be a pure inert gas, but may comprise an oxidative gas so long as no substantial oxidation of the catalyst takes place during the recovery thereof. One or a mixture of art-recognized non-oxidative gases, such as nitrogen, argon and the like may be utilized to create such atmosphere, with nitrogen being preferred. The duration of the dewaxing is adjusted to produce a low residual carbon content, for example less than 5 wt. %, preferably less than 2 wt. % and typically ranges from 30 minutes to about 8 hours. If the dewaxing step involves or includes contacting the catalyst with a solvent or supercritical fluid, it is preferably dried prior to the impregnation step. The dewaxing process may be carried out in any suitable reactors, including the HCS reactor itself. For example, fixed bed HCS reactors are well suited for dewaxing by contacting the catalyst with hydrogen at elevated temperatures. When using slurry bubble column HCS reactors it is preferred to withdraw a mixture of catalyst and hydrocarbons, more preferably during operation of the reactor and further treat the catalyst in a dedicated processing device.

In accordance with the present invention, the dewaxed catalyst is impregnated by contacting with a solution of at least one of a weak organic acid, an ammonium salt and an alkyl ammonium salt, optionally in combination with ammonia, and thereafter oxidized in the presence of the impregnating solution. The choice of solvent is dependent primarily on the capacity thereof to solubilize the ammonium salts, alkyl ammonium salts, or solubilize or be miscible with the weak organic acids as will be described below. The solvent is preferably water, however, other solvents, e.g. certain organic solvents, may be combined therewith provided that they are miscible with water and do not introduce any known catalytic poison. Mixtures of water and immiscible organic solvents can be utilized as well as mixtures of water with solvents in combination with suitable dispersing or emulsifying agents present to form a continuous phase, i.e. an emulsion. Such other suitable liquids include hydrocarbons, particularly those derived from the Fischer-Tropsch synthesis, dense fluids, for example, supercritical fluids such as liquid phase light hydrocarbons, i.e. $C_{3-5}$, alkanes, cyclopentane and the like. Preferred mixed liquids include, without any intended limitation, water/lower alkanols, water/Fischer-Tropsch products, and water/alkanols/alkanes.

The weak organic acids, ammonium salts or alkyl ammonium salts utilized in the impregnating solution are preferably those that are easily removable from the catalyst without the deposition of any material that might have a deleterious effect on the performance of the catalyst. Examples of the latter would be materials containing halogens, sulfur, phosphorus and the like.

By alkyl ammonium salts, we include mono-, di-, tri- and tetra-alkyl ammonium salts or any mixture thereof. In a non-limiting preferred embodiment, combinations of the salts with ammonia are utilized and the concentration of ammonia in the solution does not exceed about five moles per liter. Suitable weak organic acids for the subject process are carboxylic acids having the general formula R—(COOH)$_n$ wherein n is 1–3 and R represents a cyclic or aliphatic, saturated or unsaturated moiety that may be substituted with one or more nitro, amino, hydroxyl or alkoxyl groups. Specific examples of suitable acids include, without intended limitation, formic acid, acetic acid, citric acid, succinic acid, malonic acid, propionic acid, butyric acid, valeric acid, caproic acid, glutaric acid, adipic acid, lactic acid, benzoic acid, phthalic acid, salicylic acid, ascorbic acid, oxalic acid and the like. Suitable ammonium or alkyl ammonium salts include, without intended limitation, the nitrate, cyanide, carbonate, and carboxylates. The term "carboxylates" as utilized herein includes salts of the weak organic acids as defined above. Preferred examples of suitable acids and salts include, without intended limitation, acetic acid, citric acid, ammonium acetate and ammonium nitrate. While combinations of more than one of these acids or ammonium salts or alkyl ammonium salts could be utilized, in general it is preferred to utilize them individually.

The concentration of each of the constituents of the impregnating solution will depend on a number of factors including the solubility or miscibility of the weak acid, salt or salts, the volume of liquid utilized, the metal loading of the catalyst and the like. Optionally, the impregnating solution also contains ammonia in an amount up to twice the molecular equivalent of the at least one salt, said amount in any event not exceeding about five moles per liter of the impregnating solution. In general, the impregnating solution will contain from about 1% to about 30%, preferably from about 5% to about 15%, by weight of the ammonium or alkyl ammonium salt, and up to about 5 moles per liter of ammonia. In a preferred embodiment having ammonia present, the concentration thereof is chosen according to the following equation:

$$[NH_3]/(n \cdot [(NH_4^+)_n X]) \leq 1$$

wherein X is the anion of the salt, n is the charge of the anion of the salt and the bracketed expressions are concentrations in moles per liter of the impregnating solution.

The amount of the weak acid, ammonium salt or alkyl ammonium salt present, under any conditions, is less than the amount that would be required to convert all of the catalyst metals present to their corresponding salts. The impregnating solution of the ammonium or alkyl ammonium salt or salts may be prepared by simply dissolving it in the selected solvent, or by combining solution of suitable reactants that will form it in-situ, e.g. acetic acid and aqua ammonia to obtain an ammonium acetate solution.

The impregnation will typically be carried out until the supported catalyst substrate has absorbed a volume of impregnating solution equal to at least about 10% of its calculated pore volume, preferably to where conditions of incipient wetness are attained. By incipient wetness is meant that the substrate catalyst has adsorbed an amount of solution generally equivalent to its calculated pore volume. Pore volume is a discernible quantity that can be measured directly or indirectly by known techniques such as porosimetry. The volume of impregnating solution contemplated will vary from 10% to 1,000% of the calculated pore volume of the catalyst. Preferably, the volume of treatment solution will be from 30% to 200%, most preferably from about 70% to 100% of the calculated pore volume of the catalyst.

The impregnating solution will remain in contact with the catalyst for from 1 minute to 24 hours, preferably from about 5 to 120 minutes. The time required for the treatment will vary depending on factors such as the metal loading of the catalyst being treated, the quantity thereof, the composition and volume of the impregnating solution, the reactor configuration and the like. The treatment is carried out at a temperature from about 0° C. to about 100° C., preferably from room temperature, i.e. 20°–25° C., to about 80° C. The pressure is not particularly critical and can be from 0.1 to 100 atmospheres, with atmospheric pressure being preferred. It is important, however, that the impregnation be carried out under a non-oxidative atmosphere as defined above, preferably an inert atmosphere.

Once the dewaxed, supported catalyst has absorbed the desired volume of impregnating solution, it undergoes oxidation in the presence of the impregnating solution. It has been found in accordance with the present invention that the oxidation of the catalyst is significantly enhanced by the presence of the constituents of the impregnating solution. Without wishing to be bound by any particular theory, it is believed that the presence of the weak acid, ammonium or alkyl ammonium salt or salts allows the formation of and enhances the solubility of complexes of the catalyst metal, e.g. $Co^{2+}$ or $Co^{3+}$. The presence of ammonia promotes the formation of such complexes as well. The action of the weak acid, ammonium salt, alkyl ammonium salt or mixtures thereof in enhancing the solubility of the complexes promotes their distribution within the pores of the catalyst surface. This dispersing, or re-dispersing, of the catalyst metal enhances the properties of the catalyst upon activation as will be described below.

The oxidation of the catalyst is carried out by contacting with an oxidant-containing gas. As discussed above, the ammonium salt, alkyl ammonium salt or mixtures of one or more of such salts may be itself an oxidant, e.g. ammonium nitrate. Although such an ammonium salt or alkyl ammonium salt will produce some oxidation of the catalyst metal during the impregnation, the desired level of oxidation may not occur until the oxidant gas is brought into contact with it. The oxidant gas may be oxygen, air, ozone, nitrogen oxides or other gaseous oxidant, with air or a mixture of oxygen and an inert gas being preferred. Generally, the concentration of the oxidant, preferably oxygen, in the oxidant gas will be between 10 ppm and 21 vol %, preferably between 1% and 21 vol % by volume. Typically, the treatment gas pressure would be from about 0.1 atm to about 100 atm, preferably atmospheric to about 10 atm, and the gas hourly space velocities would be from about 10 V/Hr/V to about 10,000 V/Hr/V, preferably from about 100 V/Hr/V to about 1,000 V/Hr/V, expressed as standard volumes of the gas or gas mixtures (25° C., 1 atm) per hour per volume of catalyst, respectively.

The oxidation is typically exothermic and care must be taken to maintain the temperature below about 100° C., preferably below about 80° C. This is generally carried out by adjusting the concentration of the oxidant in the treatment gas to thereby prevent significant evaporation of the impregnating solution. A gradual increase in the oxidant concentration in the treatment gas has been found to provide an effective means of controlling the exotherm. Optionally, incremental replacement of the impregnating solution may be carried out during the oxidation. This serves the dual purpose of preventing the catalyst from drying out and aiding in controlling the exotherm through the cooling effect of evaporation. The use of an oxygen-containing gas in combination with an oxidant salt as the ammonium salt, e.g. ammonium nitrate, is particularly effective in the oxidation of the catalyst.

The oxidation step is generally carried out until a discernible change takes place in the catalyst and/or the reaction environment. Changes in the catalyst will include changes in color. Changes in the reaction atmosphere will include a cessation of the evolution of ammonia and/or the diminishing of the exotherm. This generally will require from about 1 to 120 minutes. Once the oxidation is concluded, the catalyst particles are preferably dried, typically at a temperature of from about 50° C. to 150° C., optionally with a gas sweep.

The treated catalyst particles are activated by reduction with hydrogen-containing gas at elevated temperatures, i.e. from about 200° C. to 600° C., preferably from about 250° C. to 400° C. Hydrogen partial pressure during the reduction would range from about 1 to 100 atmospheres, preferably from about 1 to 40 atmospheres, and the gas hourly space velocities would be from about 100 V/Hr/V to about 40,000 V/Hr/V, preferably from about 1,000 V/Hr/V to about 20,000 V/Hr/V, expressed as standard volumes of the gas or gas mixtures (25° C., 1 atm) per hour per volume of catalyst, respectively. The resulting supported catalyst particles regenerated in accordance with the present invention have been found to have a significant portion of their original activity restored, both in terms of production of the desired hydrocarbons and in methane selectivity.

As an optional step in the subject process, the supported catalyst described above is calcined under an oxidant-containing atmosphere prior to the activation step. The atmosphere is preferably air, but may be an inert atmosphere containing a controlled amount of oxygen, e.g. such as would be produced as a product gas stream or a waste gas stream from an air separation plant. Such controlled oxidant-containing atmospheres would contain from 10 ppm to 21% by volume, preferably from about 1% to 21% by volume, oxygen with the remainder being a non-oxidative gas, preferably an inert gas, such as nitrogen. The gas flow in the furnace is from about 100 to 10,000, preferably from about 1,000 to 5,000 GSHV. The calcination is carried out at elevated temperatures, i.e. from about 150° C. to about 600° C., preferably from about 200° C. to 450° C., for from about 1 to 8 hours, preferably from 1 to about 4 hours. Suitable apparatus for the calcining step may be a rotary calciner such as described in Perry's chemical Engineer's Handbook, Seventh Edition, Chapter 12, McGraw-Hill, New York (1997), a fluidized processor as will be described below or an HCS reactor itself.

It is a further optional step within the scope of the present invention to passivate the treated catalyst after the activation with hydrogen-containing gas has been carried out. The passivation may be carried out by contacting the catalyst with a gas containing carbon monoxide, or carbon monoxide and hydrogen, under conditions such that carbon monoxide does not significantly decompose and is not hydrogenated to a material degree. Such conditions, for example, would be a temperature below about 150° C., preferably between about 25° C. and 100° C., and pressure below about 20 atm, particularly between about 1 and 10 atm and the gas hourly space velocities would be from about 1 V/Hr/V to about 1,000 V/Hr/V, preferably from about 10 V/Hr/V to about 500 V/Hr/V, expressed as standard volumes of the gas or gas mixtures (25° C., 1 atm) per hour per volume of catalyst, respectively. It will be appreciated that some decomposition or hydrogenation, respectively, of the carbon monoxide may take place regardless of the precautions taken by the operator. However, it has been found that, typically, significant decomposition/hydrogenation will not take place wherein the concentration of carbon monoxide or carbon monoxide and hydrogen in the feed gas does not exceed about 5% by volume. Other passivating agents include, for example, traces of oxygen or carbon dioxide.

Often in commercial usage, a plurality of reactors are operated in parallel and in series. In accordance with the present invention, the treatment may be effected in one or more reactors or in combination with other specialized apparatus as will be discussed below. All treating steps may be carried out in a single HCS reactor. Alternatively, the catalyst may be withdrawn and returned to at least one of said HCS reactors. It is within the scope of the present invention to carry out any up to all of the treating steps in the initial reactor prior to the withdrawing step, or in the subsequent one or more reactors after the returning step.

Further, one or more of the treating steps may be carried out in the initial reactor or the subsequent one or more reactors and the remainder carried out in other specialized apparatus as will be described below. For example, when using a fixed bed HCS reactor, it is preferred to carry out at least the dewaxing step in the original reactor since it is well suited to such treatment.

When using slurry reactors, it is preferred to initially withdraw the catalyst as a mixture with hydrocarbon, typically molten wax, and carry out at least one of the treatment steps in specialized apparatus or the subsequent one or more reactors. While the amount of catalyst removed can vary within a wide range, those of ordinary skill in the art will appreciate that it is necessary that sufficient catalyst remain in the reactor to sustain the desired level of production. Generally, from about 0.01 wt. % to about 10 wt. % of the catalyst will be withdrawn from the reactor at a given point in time during production. It is not intended that such amount of catalyst be removed in a single quantity. Rather, portions of the withdrawn catalyst will be at various stages of the process of the invention at any given time so that, when a portion is returned to the subsequent one or more reactor, an estimated like amount can be withdrawn. It will be appreciated that, as utilized herein, the term "reactor" is not intended to be restricted to the singular and includes both the singular and the plural. When using the slurry reactor, it is a preferred option to continuously withdraw and replace catalyst while the reactor(s) is (are) in production.

The hydrocarbon content of the mixture withdrawn from the slurry reactor is essentially similar to that of the reactor at the mixture collection port. It is recognized that the hydrocarbon content of the mixture depends upon the type of reactor utilized, its configuration and operating conditions. For example, it is expected that a lower hydrocarbon content will be obtained when operating a bubble column reactor with a slumped bed as opposed to operating it with a dispersed bed. The mixture withdrawn from the reactor may be initially treated by conventional techniques, for example by physical screening, to separate the fines from the remaining catalyst particles. Although the criteria for what are classified as fines particles may vary with the reactor, generally fines are recognized as particles smaller than 10 microns.

Formation and accumulation of fines through attrition of the catalyst particles can result from normal operation of the reactor or from processing of the withdrawn catalyst. Accumulation of fines in the reactor can lead to operational problems. Many methods are recognized as useful for removing fines. For example, fines may be removed by classifying or screening of dry flowing powders or decantation of catalyst slurry after a specified catalyst settling time. Even though the removal of fines may be effected on dry catalyst or catalyst slurry obtained prior to returning the catalyst to a reactor, it is preferred to remove the fines during or after the dewaxing step. The activity of the supported catalyst particles separated from the fines will be enhanced in accordance with the subject invention. The fines, which may be composed of both catalyst and support material, may be processed into, for example, useful catalyst or further processed for metal recovery.

As stated above, the treatment process in accordance with the present invention may be carried out in one or more HCS reactors, in a series of apparatus particularly adapted to a specific step or steps or any combination thereof. For example, the step of decreasing the hydrocarbon content of a catalyst withdrawn from an HCS slurry reactor may advantageously be carried out in a mixer-settler vessel as is described in Perry's Chemical Engineers' Handbook, Seventh Edition, Chapter 18, McGraw-Hill, New York 1997. Such a vessel would typically be provided with a heating jacket, agitator and liquid phase withdrawing means. After treatment therein, the catalyst would be withdrawn, typically as a slurry, and be passed to a processor for solvent removal and drying.

The processor is a device that can impart mixing and fluidization to the process. It would be configured to enhance heat transfer, mixing liquid-contacting, and gas solid transfer. Examples of suitable processors are gas fluidized beds, vibro-fluidized beds, mechanical blenders, e.g. double cone, vee, ribbon and the like and mixers such as plow, planetary, paddle and the like. These devices fluidize the processed material by passing a gas directly through it, by mechanical agitation or by a combination of both actions. Processing in such a device causes the material being treated to attain fluid-like properties resulting in intimate contact between each particle and the gas stream thus creating an extremely efficient mass and heat transfer. A device that provides at least mechanical fluidization is particularly preferred since, although both a slurry and a powder can be made to readily flow, during the drying process from one to the other, the material will pass through what is termed the "mud stage" where it is extremely difficult to fluidize. Hence, for the drying operation wherein a catalyst is in a slurry, the processor should have at least mechanical and, preferably, both mechanical and gas fluidization.

A preferred processor for carrying out the subject process is the plow mixer, a device with a jacketed horizontal cylinder with an axial agitator shaft containing several sets of blade or triangular agitators. Such a device will typically also have both gas and liquid inlets and outlets as well as an inlet and outlet for the solid material being processed. While this is a preferred device, any comparable mixer possessing the foregoing capabilities could be utilized as well, provided that it has the capacity to continue to fluidize the material through the mud stage of drying. Such a device will also facilitate the solvent washing that can be part of the process of decreasing the hydrocarbon content of the material as well as the subsequent hydrogen treatment at elevated temperatures. This is a preferred method of decreasing hydrocarbon content since it permits recovery of the wax, an important consideration.

The next step, treatment with the impregnation solution as described above can likewise be carried out in a mechanical mixer, such as a plow mixer for the reasons stated above. The mixer is advantageous in that the liquid may be added while the material is in a fluidized condition. Because the mixer has inlet and outlet means for gas, when the material has been impregnated to the desired degree, the subsequent oxidation with a gaseous oxidant may be affected therein as well. At the completion of the low temperature oxidation step, as indicated by the cessation of the exotherm, the material may remain in the processor, or may be removed for further processing, for example, the removal of fines, drying and calcination steps discussed above. All of these operations may be carried out in the processor if desired. However, suitable devices for removal of fines from dry particulate solids, for example by sieving, elutriation from fluidized beds, gas classification and the like, are described in Perry's Chemical Engineers' Handbook, Seventh Edition, Chapters 17, 19 and 20, McGraw-Hill, New York 1997.

The final activation of the material to form an active catalyst can be carried out in a fluidized processor as described above. A larger variety of devices may be utilized for this step, however, since the material does not pass through a mud phase, hence gas fluidizers can be utilized for the excellent solid-gas contact they provide. It is particularly useful when the catalyst has undergone the decrease of hydrocarbon content in a fixed bed reactor. Further, a gas fluidizer may be utilized for the activating the catalyst, optionally for the passivation step described above as, again, the material does not transcend through a mud phase. It can be appreciated, that a series of varied devices can be utilized to carry out the process of the present invention, which may be advantageous for large scale operations. However, as described above, it is also possible to carry out the entire process of regeneration of the used supported catalyst in a mechanical fluidizer having the capabilities of solid, gas and liquid transfer.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLE 1

Solvent Dewaxing of Reactor Withdrawn Catalyst

Chunks of cobalt-based catalyst on a titania support in wax that were removed from a Fischer-Tropsch reactor in operation for over two hundred days weighing 83 grams were placed in a beaker and covered with toluene. The mixture was heated to 85–90° C. and stirred by hand. The chunks broke apart during the heating/stirring. After 5 minutes, the toluene/wax solution was decanted, fresh toluene added and the process repeated twice more. After the third decanting, the remaining toluene/catalyst slurry was transferred to a Buchner funnel and filtered hot. Hot toluene was poured onto the filter cake three times and drawn through the filter cake by applied vacuum. The filter cake was dried on the funnel by the application of vacuum to yield 58.4 grams of non-pyrophoric catalyst. The catalyst contained substantial amounts of reduced cobalt as indicated by its high magnetic permeability. The catalyst was easily moved with a small permanent magnet. A second sample was prepared in a like manner with the additional step of being air dried overnight after being dried on the funnel. Its characteristics were the same.

EXAMPLE 2

Hydrogen Dewaxing of Solvent Dewaxed Catalysts

Catalyst prepared in accordance with Example 1 (120 g), catalyst was charged to a fixed bed reactor, which was purged with nitrogen for 30 minutes. The reactor temperature was raised to 100° C. and the gas flow changed to 10% hydrogen in nitrogen. The temperature was then raised to 288° C. and the gas flow established at 450 sccm of pure hydrogen. The catalyst was maintained for three hours to complete removal of organic compounds and to reduce the metal components. The reactor was cooled and the gas flow changed to nitrogen when it dropped below 100° C. When the reactor had cooled to ambient temperature, the catalyst was discharged under a nitrogen atmosphere, yield 118.4 g of reduced catalyst. The catalyst contained substantial amount of metallic cobalt and was moved easily with a permanent magnet.

EXAMPLE 3

Direct Hydrogen Dewaxing of Deactivated Catalysts

Small chunks of cobalt-based catalyst on a titania support settled in wax that were removed from a Fischer-Tropsch reactor in operation for over two hundred days weighing 70–100 grams were charged to a fixed bed reactor, which was purged with nitrogen for 30 minutes. The reactor temperature was raised to 100° C. and the gas flow changed to 10% hydrogen in nitrogen. The temperature was then raised to 288° C. and the gas flow established at 450 sccm of pure hydrogen. The catalyst was maintained for three hours or until complete removal of organic compounds and to reduce the metal components. The reactor was cooled and the gas flow changed to nitrogen when it dropped below 100° C. When the reactor had cooled to ambient temperature, the catalyst was discharged under a nitrogen atmosphere, yield 40–80 g of reduced catalyst. The catalyst contained substantial amount of metallic cobalt and was moved easily with a permanent magnet.

EXAMPLE 4

Testing of Catalyst from Example 1 (solvent dewaxed)

The catalyst from Example 1 was tested in a laboratory fixed bed reactor. The catalyst (2 mL, 2.80 g) was mixed with a quartz diluent (4 mL, 6.54 g) and placed into a 1 cm inside diameter tubular reactor. The catalyst bed was held in place with a plug of glass wool. A multi-point thermocouple was inserted into the bed to monitor temperatures. The catalyst was initially reduced by hydrogen at 375° C., 19.7 atm and 315 sccm of hydrogen over two hours. The catalyst was cooled to 177° C., 19.7 atm under a flow of 10 sccm Argon and 260 sccm hydrogen. After cooling, the feed composition was changed to 12 sccm argon, 134 sccm hydrogen and 94 sccm of a carbon monoxide/carbon dioxide blend, giving a nominal feed composition of 56.0% H2, 11.6% $CO_2$, 4.9% Ar and 27.5% CO, wherein the percentages are given as mole percents. The reactor was then heated at 2.8° C./hour to 199° C. and held at temperature for 24 hours. The reactor was then heated at 2.8° C./hour to 213° C. and held at temperature for the remainder of the test.

At this temperature, the CO conversion was 27.3% and the methane selectivity was 7.6%. After 24 hours under these conditions, the CO conversion was 24.3% and the methane selectivity was 7.6%. Methane selectivity is defined as the carbon in the methane produced as a fraction of the carbon in the converted carbon monoxide.

EXAMPLE 5

Air Regeneration of Solvent Dewaxed Catalyst

Thirty grams of catalyst from Example 1 were placed in a ceramic dish and calcined in air at 300° C. for two hours. The calcined catalyst was recovered as a dry dark gray powder.

The calcined catalyst was tested for catalytic activity according the procedure described in example 4. The CO conversion was 55.0% and the methane selectivity was 10.9%. After 24 hours under these conditions, the CO conversion was 52.4% and the methane selectivity was 10.5%. This example shows that catalytic activity can be recovered by air calcination of the deactivated catalyst

EXAMPLE 6

Aqueous Low Temperature Oxidized Catalyst Utilizing Water and Air as Oxidant

The catalyst (3.2 g), prepared according to example 3, was placed in a 2 oz. bottle under a nitrogen atmosphere and 0.82 mL of water added to incipient wetness. The impregnated catalyst was then placed under an air atmosphere for an hour, after which it was dried in a vacuum oven at 80° C. and subsequently calcined in air at 300° C. for two hours.

The catalyst was tested for catalytic activity according the procedure described in example 4. The CO conversion was 55.1% and the methane selectivity was 9.5%. After 24 hours under these conditions, the CO conversion was 52.8% and the methane selectivity was 9.2%. This example shows that the activity recovery by low temperature air oxidation in presence of liquid water is essentially equivalent to air calcination.

EXAMPLE 7

Aqueous Low Temperature Oxidation of Catalyst of Example 3 Utilizing Ammonium Nitrate 5 g of catalyst from Example 3 was placed in a 2 oz. bottle nitrogen and 1.28 mL of 2 mole/l ammonium nitrate solution was added dropwise to incipient wetness under a nitrogen atmosphere. The impregnated catalyst was then placed under an air atmosphere and the mixture was stirred for several minutes during which a mild exotherm occurred raising the temperature to between 40 and 50° C. The exotherm subsided after several minutes and the color of the catalyst changed from dark gray to Prussian green and brown. The catalyst was then dried in a vacuum oven at 80° C. and subsequently calcined in air at 300° C. for two hours.

The catalyst was tested for catalytic activity according the procedure described in example 4. The CO conversion was 67.2% and the methane selectivity was 6.8%. After 24 hours under these conditions, the CO conversion was 64.9% and the methane selectivity was 6.8%. This example shows that aqueous ammonium nitrate assisted oxidation is more effective than the regeneration described in examples 5 and 6.

EXAMPLE 8

Ammonium Acetate Assisted Aqueous Low Temperature Air Oxidation of Hydrogen Dewaxed Catalyst A 1 molar solution of ammonium acetate was prepared by adding 3.0 grams of glacial acetic acid to approximately 20 grams of deionized water and 2.95 grams of ammonium hydroxide (30% NH3) and the solution was diluted to a volume of 50 ml. 3.13 grams of the ammonium acetate solution were added to ten grams of catalyst from Example 2 under inert conditions. The sample was then placed under an air atmosphere and mixed vigorously. A mild exotherm occurred which subsided after several minutes. After an additional 2 hours in air, the sample was a greenish-gray color. The sample was dried at 100° C. for 2 hr and then calcined at 300° C. for 2 hours. A dark gray powder was recovered.

The catalyst was tested for catalytic activity according the procedure described in example 4. The CO conversion was 73.9% and the methane selectivity was 7.7%. After 24 hours under these conditions, the CO conversion was 71.4% and the methane selectivity was 7.8%. Examples 7 and 8 show that the use of ammonium salts solutions is more effective than the regeneration methods described in examples 5 and 6.

EXAMPLE 9

Aqueous Ammonia/Ammonium Acetate Assisted Low Temperature Air Oxidation of Solvent\Hydrogen Dewaxed Catalyst A 3.3 molar ammonium acetate and 10.2 molar ammonia solution was prepared by adding 2 g of glacial acetic acid to 1 g of water. Sufficient 30% aqueous ammonia solution was added to bring the volume to 10 ml (weight 9.7 g, density 0.970 g/ml), resulting in a solution of ammonium acetate with an excess ammonia. Under a nitrogen atmosphere, 5.0 g of the catalyst prepared in Example 2 was placed in a 2 oz. bottle and 2.3 g of the solution were added. The mixture was stirred under air for several minutes during which a mild exotherm occurred raising the temperature to between 40 and 50° C. The exotherm subsided after several minutes. The mixture was allowed to air dry at ambient temperature for 2 ¼ hours. A lid was placed on the bottle and it was held for two days. The catalyst was then dried in air at 100° C. for two hours. The catalyst was brown after drying. The catalyst was calcined at 300° C. in air for two hours.

The catalyst was tested for catalytic activity according the procedure described in example 4. The CO conversion was 80.7% and the methane selectivity was 6.5%. After 24 hours under these conditions, the CO conversion was 78.5% and the methane selectivity was 6.5%.

EXAMPLE 10

Aqua Ammonia/Ammonium Acetate Assisted Aqueous Low Temperature Air Oxidation of Hydrogen Dewaxed Catalyst A solution was prepared by adding 7.2 grams of glacial acetic acid to approximately 20 grams of deionized water. Then 15.3 grams of ammonium hydroxide (30% NH3) was added, and the solution was diluted to a volume of 50 ml, resulting in a solution of ammonium acetate with an excess ammonia. 2.47 grams of the solution were added to ten grams of the catalyst from Example 2 to the point of incipient wetness under inert conditions. The sample was then placed under an air atmosphere and mixed vigorously. A mild exotherm occurred which subsided after several minutes. After an additional 2 hours in air, the sample was a greenish-gray color. The sample was dried at 100° C. for 1 hr and then calcined at 300° C. for 2 hours. 10.11 grams of a dark gray powder were recovered.

The catalyst was tested for catalytic activity according the procedure described in example 4. The CO conversion was 82.1% and the methane selectivity was 7.1%. After 24 hours under these conditions, the CO conversion was 78.1% and the methane selectivity was 7.3%. Examples 9 and 10 show that the regeneration efficiency is further improved by using a mixture of ammonium acetate and ammonia.

EXAMPLE 11

Aqueous Ammonia Assisted Low Temperature Air Oxidation of Solvent Dewaxed Catalyst Catalyst prepared according to Example 1 (5.4 g) was placed in a 2 oz. bottle and 1.9 g of a 30% aqueous ammonia solution were added. The mixture was stirred under air for several minutes during which a mild exotherm occurred raising the temperature to between 40 and 50° C. The exotherm subsided after several minutes. The mixture was allowed to air dry at ambient temperature for one hour. The catalyst was then vacuum dried at 70° C. overnight. The color of the catalyst was taupe, a grayish-brown color. The catalyst exhibited very low or no magnetic permeability as shown by the inability of the field of a small permanent magnet to move it. The catalyst was calcined at 300° C. in air for two hours during which the color changed to medium gray. There was obtained 5.2 g of catalyst.

The catalyst was tested for catalytic activity according the procedure described in example 4. The CO conversion was only 35.2% and the methane selectivity was 9.6%. After 24 hours under these conditions, the CO conversion was 32.7% and the methane selectivity was 9.7%.

This example shows that ammonia alone is not effective for regeneration and that a synergy is obtained by combining the ammonium acetate with ammonia as illustrated in example 9 and 10.

EXAMPLE 12

Aqua Ammonia/Ammonium Acetate Assisted Aqueous Low Temperature Air Oxidation of Calcined Dewaxed Catalyst Thirty grams of catalyst from Example 1 were placed in a ceramic dish and calcined in air at 300° C. for two hours. Material was recovered as a dry dark gray powder. A solution was prepared by adding 7.2 grams of glacial acetic acid to approximately 20 grams of deionized water. Then 15.3 grams of ammonium hydroxide (30% NH3) was added, and the solution was diluted to a volume of 50 ml. 2.75 grams of the solution were added to ten grams of the catalyst to the point of incipient wetness under inert conditions. The sample was then placed under an air atmosphere and mixed vigorously. No exotherm occurred. After an additional 2 hours in air, the sample was a gray in color. The sample was dried at 100° C. for 1 hr and then calcined at 300° C. for 2 hours. 9.77 grams of a dark gray powder were recovered.

The catalyst was tested for catalytic activity according the procedure described in example 4. The CO conversion was 59.5% and the methane selectivity was 6.0%. After 24 hours under these conditions, the CO conversion was 58.0% and the methane selectivity was 5.7%.

This example shows that the regeneration is more effective when effected on a reduced catalyst

EXAMPLE 13

Aqueous Ammonia/Ammonium Carbonate Low Temperature Air Oxidation of Example 3 Catalyst A solution was prepared by adding 30 wt % of ammonia aqueous solution to 0.8 g of ammonium carbonate to a total volume of 5 ml, resulting in a solution of ammonium carbonate with an excess ammonia. To this mixture was added an additional 5 ml of the ammonia solution and 2 ml of water. The total solution volume was about 12 ml. The solution density was 0.907 g/ml. Under a nitrogen atmosphere, 5.0 g of the catalyst prepared in Example 3 was placed in a 2 oz. bottle and 2.4 g of the solution were added. The mixture was stirred under air for several minutes during which a mild exotherm occurred raising the temperature to between 40 and 50° C. The exotherm subsided after several minutes and the color of the catalyst changed from dark gray to Prussian green and brown and then to gray and finally to a light green/gray. Another 0.5 mL of the solution was added to make up for loss due to evaporation. This caused the color to darken. The mixture was allowed to air dry at ambient temperature for 2 hours. It was then dried in air at 102° C., then calcined at 300° C. in air for two hours.

The catalyst was tested for catalytic activity according the procedure described in example 4. The CO conversion was 62.1% and the methane selectivity was 7.6%. After 24 hours under these conditions, the CO conversion was 60.9% and the methane selectivity was 7.1%.

This example shows that the aqueous Low Temperature Oxidation is effective when coupled to direct hydrogen dewaxing.

EXAMPLE 14

Aqueous Low Temperature Oxidation of Catalyst of Example 2 Utilizing Aqua Ammonia/Ammonium Formate A solution was prepared by adding 5.52 grams of formic acid to approximately 20 grams of deionized water. Then 15.327 grams of ammonium hydroxide (30% NH3) was added, and the solution was diluted to a volume of 50 ml, resulting in a solution of ammonium formate with an excess ammonia. 2.52 grams of the ammonia/ammonium formate solution were added to ten grams of the catalyst from example 2. The sample was then placed under an air atmosphere and mixed vigorously. A mild exotherm occurred which subsided after several minutes. After an additional 2 hours in air, the sample was a greenish-gray color. The sample was dried at 100° C. for 1 hr and then calcined at 300° C. for 2 hours. 9.89 grams of a dark gray powder were recovered.

The catalyst was tested for catalytic activity according the procedure described in example 4. The CO conversion was 59.6% and the methane selectivity was 8.1%. After 24 hours under these conditions, the CO conversion was 57.2% and the methane selectivity was 7.9%.

EXAMPLE 15

Aqua Ammonia/Ammonium Citrate Assisted Aqueous Low Temperature Air Oxidation of Catalyst from Example 3

A solution was prepared by adding 23.05 grams of formic acid to approximately 20 grams of deionized water. Then 15.4 grams of ammonium hydroxide (30% NH3) was added, and the solution was diluted to a volume of 50 ml, resulting in a solution of ammonium citrate with an excess ammonia. 2.75 grams of the ammonia/ammonium citrate solution were added to ten grams of the catalyst from Example 2 under inert conditions. The sample was then placed under an air atmosphere and mixed vigorously. A mild exotherm occurred which subsided after several minutes. After an additional 2 hours in air, the sample was a light gray color. The sample was dried at 100° C. for 1 hr and then calcined at 300° C. for 2 hours. 10.95 grams of a dark gray powder were recovered.

The catalyst was tested for catalytic activity according the procedure described in example 4. The CO conversion was 72.0% and the methane selectivity was 7.2%. After 24 hours under these conditions, the CO conversion was 67.2% and the methane selectivity was 6.6%.

Examples 13,14 and 15 show that ammonium salts other than ammonium acetate and ammonium nitrate are effective for regeneration.

EXAMPLE 16

Aqua Ammonia/Ammonium Acetate Assisted Aqueous Low Temperature Air Oxidation of Hydrogen Dewaxed Catalysts Prepared Below to Above Incipient Wetness A series of catalysts were prepared using varying amounts of an aqueous ammonia/ammonium acetate solution. The solution was prepared by adding 7.2 grams of glacial acetic acid to 20 g of deionized water. Then 15.3 grams of ammonium hydroxide (30% $NH_3$) was added, and the solution was diluted to a volume of 50 ml, resulting in a solution of ammonium acetate with an excess ammonia. Table 1 lists the amount of solution impregnated under inert conditions onto the catalyst samples prepared according to example 2. These amounts were calculated based on the 2.47 grams used to reach incipient wetness on a 10 gram sample. The samples were then placed under an air atmosphere and mixed vigorously. A mild exotherm occurred on all and subsided after several minutes. After an additional 2 hours in air, the samples were a greenish-gray color. The samples was dried at 100° C. for 1 hr and then calcined at 300° C. for 2 hours. Dark gray powders were recovered.

TABLE 1

| Sample | Sample Size, grams | Solution Added, grams | % of Incipient Wetness |
|---|---|---|---|
| A | 10 | 0.87 | 30 |
| B | 10 | 1.25 | 50 |
| C | 10 | 1.86 | 80 |
| D | 10 | 2.47 | 100 |
| B | 5.8 | 2.69 | 180 |
| F | 10 | 5.0 | 200 |
| 4 (ref) | 5 | 0 | 0 |

The catalysts were tested for catalytic activity according the procedure described in example 4. The CO conversion and methane selectivities are reported in Table 2.

TABLE 2

| Sample | % of Incipient Wetness | CO conversion | Methane Selectivity |
|---|---|---|---|
| A | 30 | 56.3 | 7.9 |
| B | 50 | 69.3 | 7.2 |
| C | 80 | 71.3 | 7.6 |
| D | 100 | 78.2 | 6.4 |
| E | 180 | 68.5 | 7.2 |
| F | 200 | 62.6 | 7.2 |
| 4 (reference) | 0 | 27.3 | 8.5 |

This example shows that effective regeneration is obtained when the volume of treating solution impregnated on the catalyst is in excess of 50% of incipient wetness volume.

EXAMPLE 17

Acetic Acid Assisted Aqueous Low Temperature Air Oxidation of Hydrogen Dewaxed Catalyst A solution was prepared by adding 7.21 grams of glacial acetic acid to deionized water and diluting to a volume of 50 ml. 2.75 grams of the acetic acid solution were added to ten grams of the catalyst from Example 2 under inert conditions. The sample was then placed under an air atmosphere and mixed vigorously. A mild exotherm occurred which subsided after several minutes. After an additional 2 hours in air, the sample was a greenish-gray color. The sample was dried at 100° C. for 1 hr and then calcined at 300° C. for 2 hours. 10.11 grams of a dark gray powder were recovered.

The catalyst was tested for catalytic activity according the procedure described in example 4. The CO conversion was 82.1% and the CH4 selectivity was 7.1%. After 1 day at this condition, the CO conversion was 78.1% and the CH4 selectivity was 7.3%.

EXAMPLE 18

Formic Acid Assisted Aqueous Low Temperature Air Oxidation of Hydrogen Dewaxed Catalyst A solution was prepared by adding 5.52 grams of formic acid to deionized water and diluting to a volume of 50 ml. 2.80 grams of the formic acid solution were added to ten grams of the catalyst from Example 2 under inert conditions. The sample was then placed under an air atmosphere and mixed vigorously. A mild exotherm occurred which subsided after several minutes. After an additional 2 hours in air, the sample was a greenish-gray color. The sample was dried at 100° C. for 1 hr and then calcined at 300° C. for 2 hours. 10.4 grams of a dark gray powder were recovered.

The catalyst was tested for catalytic activity according the procedure described in example 4. The CO conversion was 72.6% and the $CH_4$ selectivity was 7.1%. After 1 day at this condition, the CO conversion was 69.4% and the $CH_4$ selectivity was 6.9%.

EXAMPLE 19

Citric Acid Assisted Aqueous Low Temperature Air Oxidation of Hydrogen Dewaxed Catalyst A solution was prepared by adding 23.05 grams of citric acid to deionized water and diluting to a volume of 50 ml. 2.77 grams of the citric acid solution were added to ten grams of the catalyst from Example 2 under inert conditions. The sample was then placed under an air atmosphere and mixed vigorously. A mild exotherm occurred which subsided after several minutes. After an additional 2 hours in air, the sample was a light gray color. The sample was dried at 100° C. for 1 hr and then calcined at 300° C. for 2 hours. Approximately 10 grams of a dark gray powder were recovered.

The catalyst was tested for catalytic activity according the procedure described in example 4. The CO conversion was 64.1% and the $CH_4$ selectivity was 7.1%. After 1 day at this condition, the CO conversion was 60.9% and the $CH_4$ selectivity was 7.1%.

Examples 17, 18 and 19 show that acid assisted Low Temperature Oxidations are more effective than the regeneration methods described in examples 5 and 6.

EXAMPLE 20

Triethyl Ammonium Acetate Assisted Aqueous Low Temperature Air Oxidation of Hydrogen Dewaxed Catalyst A solution was prepared by adding 12.13 grams of triethylamine to approximately 25 ml of deionized water. Then 7.25 grams of glacial acetic acid were added and diluted to a total volume of 50 ml and stored under the nitrogen atmosphere. 2.38 grams of the solution were added to ten grams of a reduced, dewaxed spent catalyst under inert conditions. The sample was then placed under an air atmosphere and mixed vigorously. An exotherm occurred which subsided after several minutes. After an additional 2 hours in air, the sample was a green color. The sample was dried at 100° C. for 1 hr and then calcined at 300° C. for 2 hours. 10.32 grams of a dark gray powder were recovered.

The catalyst was tested for catalytic activity according the procedure described in example 4. After reaching 213° C., the CO conversion was 76% and the CH4 selectivity was 7.2%. After 1 day at this condition, the CO conversion was 73% and the CH4 selectivity was 7.1%.

What is claimed is:

1. A process for the catalytic hydrogenation of carbon monoxide to produce a mixture of hydrocarbons in a carbon monoxide hydrogenation reactor utilizing a used supported catalyst, said catalyst comprising one or more members selected from the group consisting of Co, Ni, Cu, Ru, Rh, Pd, Os, Ir, Re and Pt, including treating at least a portion of the catalyst by a sequence comprising:

a) decreasing the hydrocarbon content of the catalyst;

b) impregnating under a non-oxidative atmosphere with a solution of at least one member selected from the group consisting of ammonium salts, alkyl ammonium salts and weak organic acids, optionally including ammonia;

c) oxidizing with a gaseous oxidant in the presence of the impregnating solution;

d) reducing with a hydrogen-containing gas at elevated temperatures, and e) reusing the catalyst for the catalytic hydrogenation of carbon monoxide.

2. A process in accordance with claim 1, wherein the hydrocarbon content of the catalyst is decreased by one of the following steps:

contacting the catalyst with a hydrogen-containing gas at a temperature of from about 200° C. to 600° C.;

treating the catalyst with a solvent or supercritical fluid;

treating the catalyst with a solvent or supercritical fluid and then contacting it with a hydrogen-containing gas at a temperature of from about 200° C. to 600° C.;

contacting the catalyst with an oxygen-containing gas or steam at elevated temperatures and then contacting it with a hydrogen-containing gas at a temperature of from about 200° C. to 600° C.; and treating the catalyst with a solvent or supercritical fluid, contacting the catalyst with an oxygen-containing gas or steam at elevated temperatures and then contacting it with a hydrogen-containing gas at a temperature of from about 200° C. to 600° C.

3. A process in accordance with claim 1 wherein said at least one member of the impregnating solution in step b) is less than the amount of said salt or weak organic acid that would be required to convert substantially all of said at least one catalyst metal to its corresponding salts.

4. A process in accordance with claim 1 wherein the ammonium salt or alkyl ammonium salt in the impregnating solution in step b) is selected from the group consisting of nitrate, acetate, formate, citrate and carbonate.

5. A process in accordance with claim 1, wherein the impregnating solution in step b) contains ammonia and the concentration of ammonia is chosen according to the following equation:

$$[NH_3]/(n \cdot [(NH_4^+)_n X]) \leq 1$$

wherein X is the anion of the salt, n is the charge of the anion of the salt and the bracketed terms are concentrations expressed in moles per liter of the impregnating solution.

6. A process in accordance with claim 1 wherein at least one member in the impregnating solution in step b) is selected from the group consisting of acetic acid, citric acid, succinic acid, malonic acid and formic acid.

7. A process in accordance with claim 1 wherein said oxidant in step c) is selected from the group consisting of oxygen, air, ozone and nitrogen oxides.

8. A process in accordance with claim 1 wherein the amount of said impregnating solution utilized in step c) is from about 10% to 1,000% of the calculated pore volume of the catalyst.

9. A process in accordance with claim 1 wherein the temperature during the oxidation in step c) is maintained below about 100° C.

10. A process in accordance with claim 1 wherein the catalyst is reduced in step d) by treatment with hydrogen-containing gas at temperatures from about 200° C. to 600° C.

11. A process in accordance with claim 1 additionally including the step of calcining under an oxidant-containing atmosphere after step c).

12. A process in accordance with claim 1 additionally including the step of passivating after step d) by:

treatment with a carbon monoxide-containing gas under conditions such that the carbon monoxide is not significantly decomposed; or treatment with a gas containing carbon monoxide and hydrogen under conditions such that the carbon monoxide is not significantly hydrogenated.

13. A process in accordance with claim 1, additionally including the step of removing catalyst fines by i) classification or screening of a powder obtained in any step producing a powder; or ii) decanting or classification of a catalyst slurry in any step producing a slurry.

14. A process in accordance with claim 1, wherein said catalyst comprises cobalt.

15. A process according to claim 1, wherein steps (a through (e are carried out in a single carbon monoxide hydrogenation reactor.

16. A process according to claim 15, wherein the carbon monoxide hydrogenation reactor is a fixed bed reactor.

17. A process according to claim 1, additionally including the steps of withdrawing catalyst from a reactor and returning it to at least one reactor, wherein steps (a through (d are carried out subsequent to said withdrawing step.

18. A process according to claim 17 wherein steps (a through (d are carried out prior to said returning step.

19. A process according to claim 18, wherein steps (a through (e are carried out subsequent to said returning step.

20. A process according to claim 1, additionally including the steps of withdrawing catalyst from a reactor and returning it to at least one reactor, wherein at least one of steps (a through (d is carried out prior to said withdrawing step.

21. A process according to claim 20, wherein at least one of steps (b through (d is carried out prior to said returning step.

22. A process according to claim 1, additionally including the steps of withdrawing catalyst from a reactor and returning it to at least one reactor, wherein at least one of steps (a through (d is carried out prior to said withdrawing step, and at least one of steps (b through (e is carried out subsequent to said returning step.

23. A process according to claim 22, wherein the catalyst is passivated after step a) and then withdrawn from the reactor.

24. A regenerated supported metal catalyst for the catalytic hydrogenation of carbon monoxide comprising one or more members selected from the group consisting of Co, Ni, Cu, Ru, Rh, Pd, Os, Ir, Re and Pt, said catalyst being regenerated by:
   a) decreasing the hydrocarbon content of the catalyst;
   b) impregnating under a non-oxidative atmosphere with a solution of at least one member selected from the group consisting of ammonium salts, alkyl ammonium salts and weak organic acids, optionally including ammonia;
   c) oxidizing with a gaseous oxidant in the presence of the impregnating solution;
   d) reducing with a hydrogen-containing gas at elevated temperatures.

25. A regenerated supported metal catalyst in accordance with claim 24, wherein said catalyst comprises cobalt.

26. A process for producing $C_{10}+$ hydrocarbons by the hydrogenation of carbon monoxide by reaction with hydrogen at reaction conditions wherein the catalyst comprises a regenerated catalyst according to claim 24.

27. A process in accordance with claim 26, wherein at least a portion of the hydrocarbons formed are upgraded to more valuable products by at least one of fractionation and conversion operations.

28. A process for the catalytic hydrogenation of carbon monoxide to produce a mixture of hydrocarbons in at least one slurry reactor utilizing a supported catalyst, said catalyst comprising one or more members selected from the group consisting of Co, Ni, Cu, Ru, Rh, Pd, Os, Ir, Re and Pt, said process comprising:
   a) withdrawing a mixture comprising hydrocarbons and a portion of said catalyst from a reactor;
   b) decreasing the hydrocarbon content of the catalyst;
   c) impregnating under a non-oxidative atmosphere with a solution of at least one member selected from the group consisting of ammonium salts, alkyl ammonium salts and weak organic acids, optionally including ammonia;
   d) oxidizing with a gaseous oxidant in the presence of the impregnating solution;
   e) reducing with a hydrogen-containing gas at elevated temperatures, and
   f) returning at least a portion of the catalyst in at least one reactor for the catalytic hydrogenation of carbon monoxide.

29. A process in accordance with claim 28, wherein the hydrocarbon content of the catalyst is decreased by one of the following steps:
   contacting the catalyst with a hydrogen-containing gas at a temperature of from about 200° C. to 600° C.;
   treating the catalyst with a solvent or supercritical fluid;
   treating the catalyst with a solvent or supercritical fluid and then contacting it with a hydrogen-containing gas at a temperature of from about 200° C. to 600° C.;
   contacting the catalyst with an oxygen-containing gas or steam at elevated temperatures and then contacting it with a hydrogen-containing gas at a temperature of from about 200° C. to 600° C.; and
   treating the catalyst with a solvent or supercritical fluid, contacting the catalyst with an oxygen-containing gas or steam at elevated temperatures and then contacting it with a hydrogen-containing gas at a temperature of from about 200° C. to 600° C.

30. A process in accordance with claim 28, wherein in step b) the catalyst particles are initially separated from the mixture.

31. A process in accordance with claim 30, wherein the catalyst particles are initially separated from the mixture by filtration, or by gravitational or centrifugal separation followed by decanting the hydrocarbons from the catalyst particles.

32. A process in accordance with claim 28, wherein at least one of step b) or d) additionally includes drying the catalyst.

33. A process in accordance with claim 28, wherein said at least one member of the impregnating solution in step c) is less than the amount of said salt or weak organic acid that would be required to convert substantially all of said at least one catalyst metal to its corresponding salts.

34. A process in accordance with claim 28, wherein the ammonium salt or alkyl ammonium salt in the impregnating solution in step b) is selected from the group consisting of nitrate, acetate, formate, citrate and carbonate.

35. A process in accordance with claim 28, wherein the impregnating solution in step b) contains ammonia and the concentration of ammonia is chosen according to the following equation:

$$[NH_3]/(n \cdot [(NH_4^+)_n X]) \leq 1$$

wherein X is the anion of the salt, n is the charge of the anion of the salt and the bracketed terms are concentrations expressed in moles per liter of the impregnating solution.

36. A process in accordance with claim 28, wherein at least one member in the impregnating solution in step b) is selected from the group consisting of acetic acid, citric acid, succinic acid, malonic acid.

37. A process in accordance with claim 28 wherein said oxidant in step d) is selected from the group consisting of oxygen, air, ozone and nitrogen oxides.

38. A process in accordance with claim 28 wherein the amount of said impregnating solution utilized in step d) is from about 10% to 1,000% of the calculated pore volume of the catalyst.

39. A process in accordance with claim 28 wherein the temperature during the oxidation in step d) is maintained below about 100° C.

40. A process in accordance with claim 28, wherein the catalyst is reduced in step e) by treatment with hydrogen-containing gas at temperatures from about 200° C. to 600° C.

41. A process in accordance with claim 28 additionally including the step of calcining under an oxidant-containing atmosphere after step d).

42. A process in accordance with claim 28 additionally including the step of passivating after step e) by:
   treatment with a carbon monoxide-containing gas under conditions such that the carbon monoxide is not significantly decomposed; or
   treatment with a gas containing carbon monoxide and hydrogen under conditions such that the carbon monoxide is not significantly hydrogenated.

43. A process in accordance with claim 28, additionally including the step of removing catalyst fines by
   i) classification or screening of a powder obtained in any step producing a powder; or
   ii) decanting or classification of a catalyst slurry in any step producing a slurry.

44. A process in accordance with claim 28, wherein said catalyst comprises cobalt.

45. A process in accordance with claim 28, wherein the treated catalyst is returned in at least one slurry reactor by one or more of:
   forming a slurry of the catalyst with liquid hydrocarbons and introducing said slurry into said reactor;

forming a suspension of the catalyst in a non-oxidizing gas and introducing said suspension into said reactor; or transferring the catalyst to the reactor by gravity or pressure gradient.

46. A process in accordance with claim 28, wherein said supported catalyst is withdrawn periodically during operation of at least one slurry reactor.

47. A process according to claim 46, wherein at least a portion of said supported catalyst is returned to at least one slurry reactor during operation thereof.

48. A process in accordance with claim 28, wherein said supported catalyst is withdrawn continuously during operation of at least one slurry reactor.

49. A process according to claim 48, wherein at least a portion of said supported catalyst is returned to at least one slurry reactor during operation thereof.

50. A regenerated supported metal catalyst for the catalytic hydrogenation of carbon monoxide comprising one or more members selected from the group consisting of Co, Ni, Cu, Ru, Rh, Pd, Os, Ir, Re and Pt, said catalyst being regenerated by:

a) withdrawing a mixture comprising hydrocarbons and a portion of said catalyst from a reactor;

b) decreasing the hydrocarbon content of the catalyst;

c) impregnating under a non-oxidative atmosphere with a solution of at least one member selected from the group consisting of ammonium salts, alkyl ammonium salts and weak organic acids, optionally including ammonia;

d) oxidizing with a gaseous oxidant in the presence of the impregnating solution; and e) reducing with a hydrogen-containing gas at elevated temperatures.

51. A regenerated supported metal catalyst in accordance with claim 50, wherein said catalyst comprises cobalt.

52. A process for producing $C_{10}+$ hydrocarbons by the hydrogenation of carbon monoxide by reaction with hydrogen at reaction conditions wherein the catalyst comprises a regenerated catalyst according to claim 50.

53. A process in accordance with claim 52, wherein at least a portion of the hydrocarbons formed are upgraded to more valuable products by at least one of fractionation and conversion operations.

54. A process for producing $C_{10}+$ hydrocarbons by the hydrogenation of carbon monoxide by reaction with hydrogen at reaction conditions wherein the catalyst comprises a regenerated catalyst according to claim 51.

55. A process in accordance with claim 54, wherein at least a portion of the hydrocarbons formed are upgraded to more valuable products by at least one of fractionation and conversion operations.

* * * * *